United States Patent [19]
Freye et al.

[11] 4,374,653
[45] Feb. 22, 1983

[54] PROCESS CONTROL

[75] Inventors: Anne D. Freye, Amsterdam; Johan A. van Arkel, The Hague, both of Netherlands

[73] Assignee: Shell Oil Company, Houston, Tex.

[21] Appl. No.: 890,356

[22] Filed: Mar. 27, 1978
(Under 37 CFR 1.47)

Related U.S. Application Data

[63] Continuation of Ser. No. 739,169, Nov. 5, 1976, abandoned.

[51] Int. Cl.³ .............................................. B01D 53/14
[52] U.S. Cl. ............................................. 55/18; 55/73
[58] Field of Search ............... 55/18, 73, 161, 165, 55/270, 89, 227; 210/96 R; 137/2, 8

[56] References Cited

U.S. PATENT DOCUMENTS

| | | | |
|---|---|---|---|
| 3,446,709 | 5/1969 | Marshall | 55/227 X |
| 3,656,275 | 4/1972 | Hunter | 55/73 X |
| 3,709,976 | 1/1973 | Tarhan | 55/73 X |
| 3,738,086 | 6/1973 | Bellisio et al. | 55/89 X |
| 3,798,309 | 3/1974 | Knowles et al. | 55/73 X |
| 3,954,425 | 5/1976 | Gunther | 55/73 X |
| 3,967,937 | 7/1976 | Hobbs | 55/18 |
| 3,984,529 | 10/1976 | Tung | 55/73 X |

FOREIGN PATENT DOCUMENTS 320315 12/1971 U.S.S.R. ............................................. 55/18

Primary Examiner—Robert H. Spitzer

[57] ABSTRACT

A method is disclosed for uniformization of amounts of $SO_2$ in the gas stream issuing from the stripping zone of a plant processing streams containing variable quantities of $SO_2$.

3 Claims, 6 Drawing Figures

PROCESS CONTROL

This is a continuation of application Ser. No. 739,169, filed Nov. 5, 1976, now abandoned.

BACKGROUND OF THE INVENTION

The invention relates to a process for the automatic control of a plant for processing a flow of gas with a strongly fluctuating $SO_2$ content, and is aimed at obtaining a flow of $SO_2$-containing gas such that $SO_2$ is discharged at a steadier rate.

More particularly, a flow of gas containing $SO_2$ may come from a combustion unit fired on sulfur-containing fuel, such as certain fuel oils or coal. It is undesirable for such gases to be discharged into the atmosphere without precautions being taken, and several different methods are known that are intended to prevent pollution of the atmosphere by this cause. This requires the removal of the $SO_2$ from the gas and its conversion into a non-volatile substance.

One method of $SO_2$ removal is the conversion of $SO_2$ into elementary sulfur according to a Claus process, which may or may not be modified. In the Claus process, sulfur is formed according to the reaction $2H_2S + SO_2 \rightarrow 3S + 2H_2O$. Obviously, the supply of $H_2S$ and $SO_2$ has to take place in the stoichiometrically required quantities, because otherwise the gases issuing from the Claus unit cannot yet be discharged. In case of a varying supply of $SO_2$, the supply of $H_2S$ must vary accordingly, or, when the supply of $H_2S$ is constant, an additional and variable supply of $SO_2$ must be applied, for which a separate source of $SO_2$ must then be available. In both cases the varying $SO_2$ content of the gas flow to be processed causes considerable operational problems.

Another method for the conversion of $SO_2$ into a non-volatile compound is the conversion of the $SO_2$ into $H_2SO_4$. For this process a variable supply of $SO_2$ is also very undesirable.

In general, the concentration of $SO_2$ in flue gases or in other spent gases is lower than 5 percent by volume. This concentration is too low for direct treatment in a conversion unit to be applied. Moreover, the flue gases in most cases still contain oxygen, which causes an additional consumption of reducing agent in the Claus process unit. Therefore, it is important that use be made of an intermediate step in which the $SO_2$-containing gas is concentrated and at the same time the $SO_2$ is separated from the oxygen.

In the Netherlands patent application No. 7,102,211, a method is described in which the $SO_2$ is bound directly to a solid such as CuO. The solid acceptor material must be regenerated to enable it to be used repeatedly. This can be done with a reducing gas such as $H_2$. As a result, $SO_2$ will be released again and this $SO_2$, in a concentration which on the average will be higher, can now be further processed together with steam and reducing gas. This gas contains hardly any oxygen. However, the $SO_2$ content of this gas varies from almost zero at the beginning of the regeneration to a maximum value, after which it decreases to almost zero again at the end of the regeneration. The $SO_2$ concentration in the regeneration gas is from about 5 percent to about 20 percent by volume, and is mostly about 10 percent by volume.

A gas in which the $SO_2$ concentration varies to such a large extent is also obtained if the flue gases or other spent gases are treated with a liquid absorbent, which in turn is regenerated.

It is an object of the invention to provide a process by which the varying quantities of $SO_2$ present in such gases can be controlled so that the concentrations of $SO_2$ are more evenly distributed.

SUMMARY OF THE INVENTION

Accordingly, the invention relates to an improvement in the control of a plant for processing a flow of gas with a strongly fluctuating $SO_2$ content, and is aimed at obtaining a flow of $SO_2$-containing gas such that $SO_2$ is discharged at a more uniform or steadier rate. More particularly, the invention comprises an improvement in that process for the removal and treatment of $SO_2$ from a gas stream containing $SO_2$, wherein the gas stream is contacted in an absorption zone with a liquid absorbent that is selective for $SO_2$ to produce a $SO_2$-containing absorbent and a purified gas stream, and the $SO_2$-containing absorbent is passed to a stripping zone and stripped to produce a regenerated absorbent and an $SO_2$-containing gas flow, the regenerated absorbent being returned to the absorption zone. The gas flow may then be passed to an $SO_2$-conversion unit. The improvement comprises uniformizing the amount of $SO_2$ in the $SO_2$-containing gas flow by adjusting the flow of the $SO_2$-containing absorbent to the stripping zone in response to the output signal from a flow controller which compares the measured value of the rate of the $SO_2$-containing gas flow with a set value, the set value in turn being the output signal from an $SO_2$-concentration controller which compares a signal corresponding to the $SO_2$ concentration in the absorbent flow with a set value for that concentration. In its preferred form, the signal corresponding to the $SO_2$-concentration in the flow of $SO_2$-containing absorbent is obtained by dividing a signal derived from the measured value of the rate of the gas flow by a signal derived from the measured value of the rate of the flow of absorbent. In its most preferred form, the invention comprises a process of the type described wherein a signal derived from the expected average supply of $SO_2$ to the absorption zone is added to the set value for the flow controller.

The process of the invention uses means which in themselves are known, such as an absorber or absorption zone and a stripper or stripping zone. By these means a gas flow is obtained in which the concentration of $SO_2$ is very high, mostly more than 90 percent by volume, but where the quantities of $SO_2$ fluctuate strongly if no special measures are taken.

As indicated, the process of automatic control according to the invention meets the requirement of a steadier discharge of $SO_2$. The rate of the flow of liquid absorbent to the stripping zone or stripper is adjusted by a controller by means of a valve. An obvious method would be to measure the amount of $SO_2$ in the liquid absorbent and to use this value as set value for the said controller. However, this measurement cannot be carried out in a way that is both simple and reliable. By contrast, the process of the invention in the first instance uses the measured value of the rate of the gas flow from the stripper. The flow controller aims at maintaining that rate at a desired value. This control system is capable of keeping the amount of $SO_2$ issuing from the stripper constant for a short term, so long as the $SO_2$ concentration in that gas flow does not vary.

In the process according to the invention, however, the set value for the flow controller is changed according to a control scheme with a long-term aim. The SO$_2$-concentration in the flow of absorbent from the absorber to the stripper is a measure of the quantity of SO$_2$ eventually issuing from the stripper and the SO$_2$-concentration controller aims at a constant value of this quantity. Now, although continuous measurement of the SO$_2$-concentration in a flow of liquid is feasible, it is not easy. A signal corresponding to the SO$_2$-concentration in the flow of absorbent can be obtained by dividing a signal derived from the measured value of the rate of the gas flow from the stripper by a signal derived from the measured value of the rate of the flow of absorbent to the stripper. This is an attractive method, because the two flows mentioned are measured anyhow and the use of a meter measuring the SO$_2$-concentration directly is avoided. All SO$_2$ issuing from the stripper in the gaseous state is supplied with the liquid absorbent. This implies that if, for instance, the SO$_2$-concentration in the liquid flow increases while the liquid flow remains unchanged, then the SO$_2$ gas flow issuing from the stripper will increase. The quotient of the two measurement signals will then increase as well, which shows that this quotient is a measure of the SO$_2$ concentration in the liquid flow.

The SO$_2$-concentration controller supplies the set value for the flow controller and thus acts on the SO$_2$ flow from the stripper. The control system matches the average SO$_2$ flow from the stripper to the average SO$_2$ supply to the absorber. The supply of SO$_2$ to the absorber, originating, for instance, from the regeneration of a loaded solid acceptor for SO$_2$, is not constant. Therefore, the total system should incorporate a buffer where a temporary excess of supplied SO$_2$ can be stored, which store is used again when the SO$_2$ supply to the absorber temporarily decreases below the average. As soon as, for instance, the SO$_2$ supply to the absorber increases, the SO$_2$ concentration in the absorbent will increase. The aforementioned quotient will then increase and, as a result, the flow controller will decrease the absorbent supply to the stripper. An important aspect of the control process according to the invention is that the increase in the supply of SO$_2$ leads to an increase in the concentration of SO$_2$ in the absorbent, by which a temporary storage of the SO$_2$ in the system has been obtained. The control system acts on the rate of supply of liquid to the stripper and allows the SO$_2$ concentration in the absorbent to vary. A great advantage of this is that a buffer vessel for absorption liquid, which has to be provided anyhow to ensure stable operation of an absorber/stripper system, can be small. It is customary for the bottom sections of the absorber and the stripper to be provided with level control devices which in fact are limiting control devices. The liquid levels may vary within wide limits. The liquid flow from the stripper to the absorber is here the manipulated variable for the level control of the stripper.

It may be of importance that a signal derived from the expected average supply of SO$_2$ to the absorber is added to the set value for the flow controller. This signal is not necessarily generated automatically. It may, for instance, be related to the change to a fuel having a different sulfur content. In most cases it is a matter of a deliberate change being made in conditions that remain valid for a long time. Otherwise, it is within the purview of the invention to arrange for the signal in question to be derived automatically from a suitable variable, for instance from the quantity of fuel to be burnt and/or from the sulfur content of the fuel.

The invention will now be illustrated with reference to the accompanying drawing.

Figure 1:
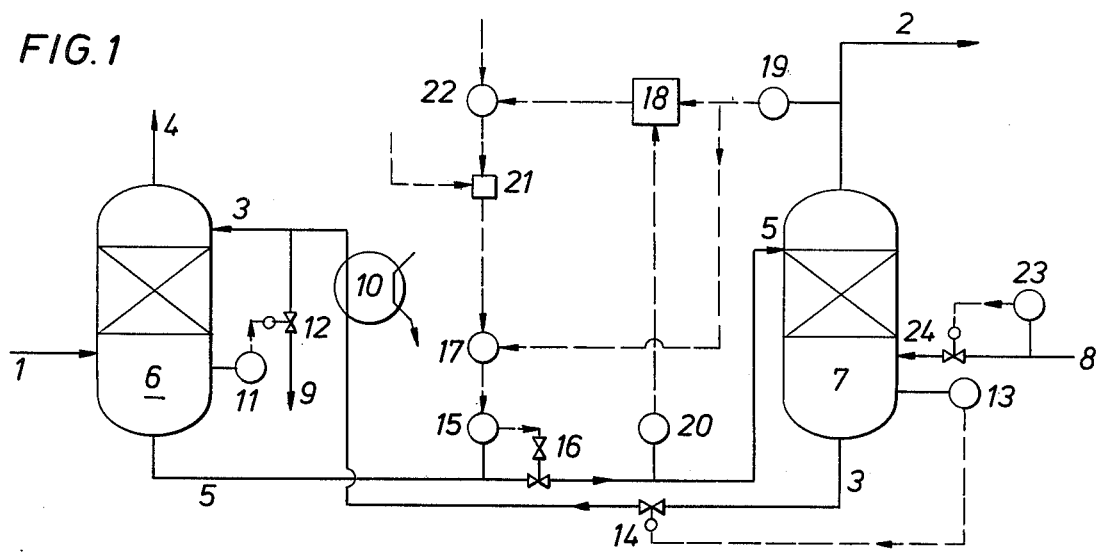
FIG. 1 is a diagrammatic representation of a control process according to the invention.

In FIG. 1, an SO$_2$-containing gas in line (1) is passed to absorber (6) and is there contacted with liquid absorbent from line (3). The absorber (6) may be a column equipped with trays or provided with a packing consisting of rings, beads, globules, etc. The liquid absorbent in line (3) must be capable of being regenerated by supplying heat and should preferably be selective for SO$_2$ absorption. This is important particularly if gases have to be purified which contain much CO$_2$, such as flue gases. Suitable absorbents, apart from water, are N-methyl pyrrolidone, dimethyl aniline, sulfolane, sulfinol and the like.

Gas stripped of SO$_2$ leaves the absorber (6) in line (4). Liquid absorbent containing SO$_2$ issues from the bottom section of absorber (6) in line (5). The absorbent is passed to the stripper (7), where the absorbent is contacted with a hot gas, in this example, steam from line (8). The stripper (7) is also provided with liquid/gas contacting means such as trays or packings. This treatment results in a gas flow in line (2) that is rich in SO$_2$. This gas flow goes to an SO$_2$ conversion unit, such as a Claus unit (not shown). Purified absorbent issues from the bottom section of the stripper (7) in line (3). This flow goes via a cooler (10) to the absorber (6). If the absorbent is water, and if the flow in line (8) is steam, then condensation of steam occurs in stripper (7). As a result, the volume of liquid in line (3) becomes too large for complete recirculation. Also, condensation of water may occur in the absorber (6) if the gas in line (1) contains water vapor. The excess of water can be discharged as side stream (9).

The liquid level in the bottom section of the absorber (6) is controlled with a controller (11) that operates a valve (12) in the line for the side stream (9). This level control system is a limiting control system. The liquid level in the bottom section of the stripper (7) is controlled with a controller (13) that operates a valve (14) in the line (3) for the recycle. This control system, too, is a limiting control system.

Controller (15) operates valve (16) in the line (5) for the flow of absorbent from the absorber (6) to the stripper (7). This controller is a slave controller which is cascade-connected to flow controller (17). The measured value for controller (22) derives from a division in the divider (18) of two measured rate of flow values. The rate of flow of the gas in line (2) is measured with meter (19) and that of the liquid flow in line (5) with meter (20). The quotient thus obtained, which as measured value goes to controller (22), is representative of the SO$_2$ concentration in line (5). The output signal of controller (22) goes via an adder (21) to controller (17) as the set value for that controller. The measured value of flow in line (2) originating from meter (19) also goes as measured value to controller (17).

With controller (23) and valve (24) the supply of steam in (8) is maintained at a desired value or adjusted so as to be at a constant ratio to flow of liquid in (5). To the set value for controller (17) a signal may be added, via the adder (21), which has been derived from the expected average supply of SO$_2$ via the flow in line (1) to the absorber (6).

Figure 2:
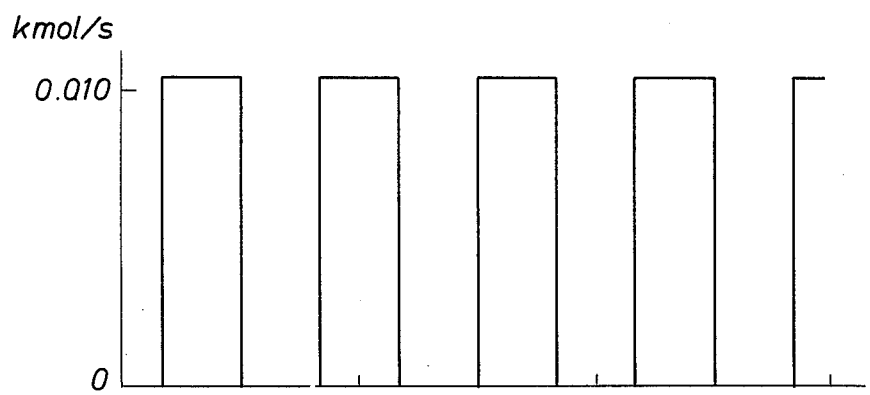
Figure 3:
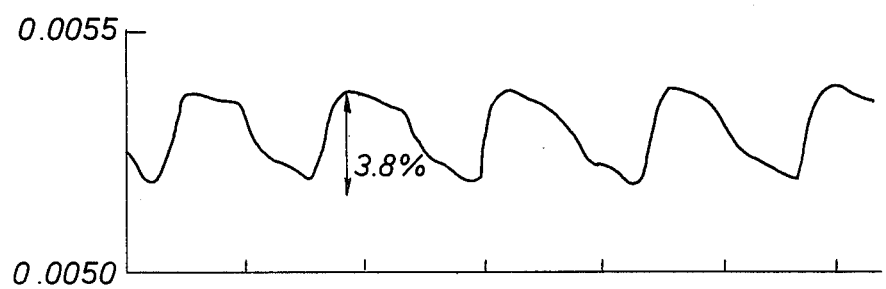
Figure 4:
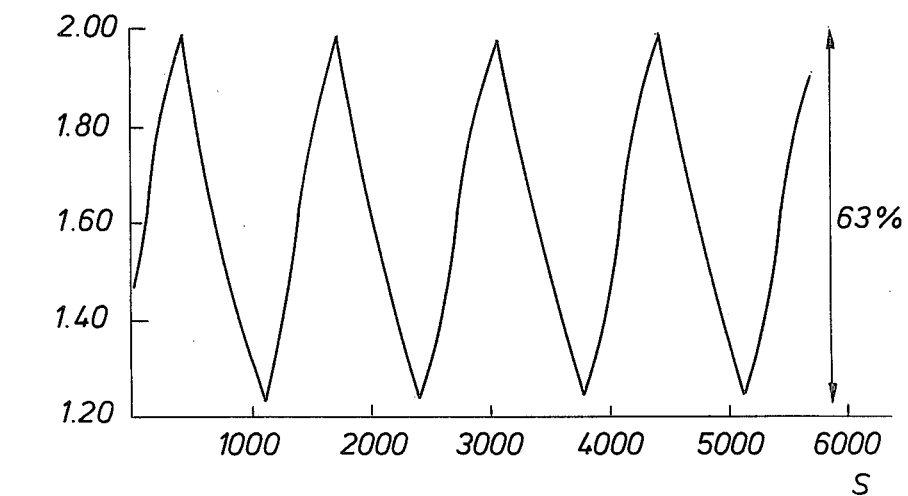

Results obtained with a control process according to the invention are shown in FIGS. 2, 3 and 4. These figures have a common time axis, covering the range from 0 to 6,000 s. The example relates to a plant as shown in FIG. 1.

The supply of SO$_2$ is periodic, as shown in FIG. 2 with a quantity of 0.0104 kmol/s, each time for 690 s (flow in line (1) in FIG. 1). During the intervening periods, of 660 s each, there was no supply of SO$_2$. The result of the control is shown in FIG. 3. Plotted on the vertical axis is the quantity of SO$_2$ issuing from the stripper per unit time (flow in line (2) in FIG. 1), again expressed in kmol/s, but plotted to a scale 16 times larger than that applied in FIG. 2. The amplitude of the variation in the quantity of SO$_2$ that is discharged in line (2) is found to be only 3.8 percent of the average discharge of SO$_2$. Obviously, this is an enormous improvement with respect to the periodic supply according to FIG. 2, with variations of square wave form and with zero as the lowest value.

FIG. 4 shows how the total liquid flow in line (5) (FIG. 1), expressed in kmol/s, varies with time. Thus, the flow represented here is the flow of liquid absorbent, for instance water, in which SO$_2$ is present. This liquid flow is the manipulated variable in the control system due to the action of the cascade-connected controllers (15), (17) and (22) via valve (16). In this liquid flow there occur fluctuations of 63 percent relative to the minimum value of this stream.

It is found that a buffer volume of only 30 m$^3$ is required to make the system operate properly, as against 130 m$^3$ when a conventional system is used. The small volume of 30 m$^3$ is always present in an absorber/stripper system.

Figure 5:
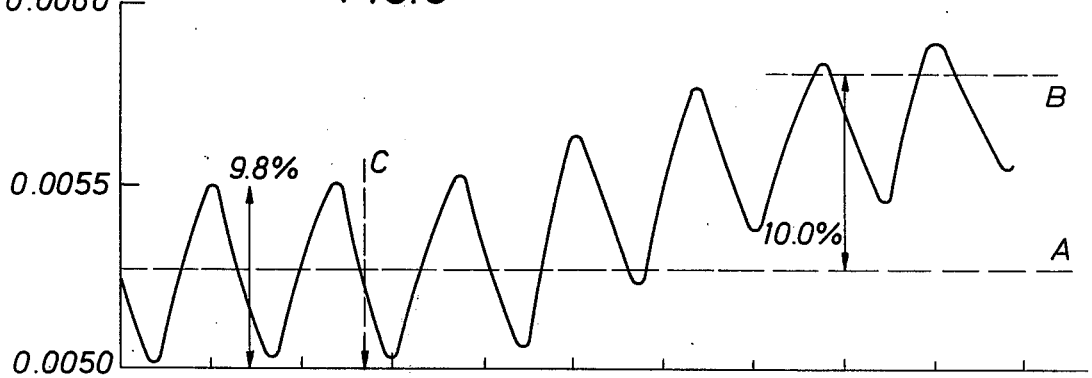
FIGS. 2–6 show results of a control process according to the invention.
Figure 6:
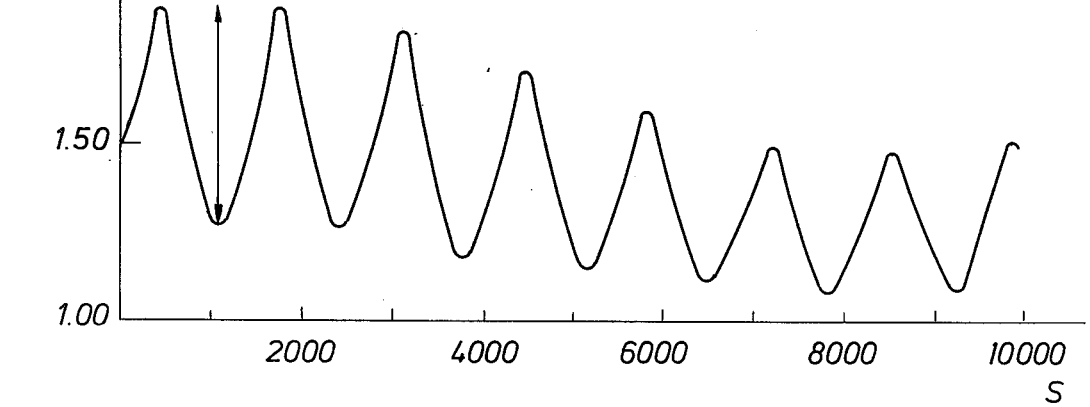

FIGS. 5 and 6 have the same time scale in seconds, and illustrate another result of the invention. Along the vertical axis in FIG. 5 has been plotted the quantity of SO$_2$ issuing from the stripper per unit time, expressed in kmol/s. The dashed line A represents the average value of it until about 2,700 seconds. At that moment, indicated by the arrow C, the supply of SO$_2$ to the absorber has been increased to a new average value being 10 percent higher, indicated by the dashed line B. FIG. 6 shows the resulting change in the flow of absorbent from absorber to stripper. The total flow of absorbent has again been plotted on the vertical axis in kmol/s. This figure shows a gradual decrease in the average magnitude of this flow, which is the result of the SO$_2$ content on the average being higher.

We claim as our invention:

1. In a process for the removal and treatment of SO$_2$ from a gas stream containing SO$_2$, wherein the gas stream is contacted in an absorption zone with a liquid absorbent that is selective for SO$_2$ to produce a SO$_2$-containing absorbent and a purified gas stream; the SO$_2$-containing absorbent is passed to a stripping zone and stripped to produce a regenerated absorbent and an SO$_2$-containing gas flow; and the regenerated absorbent is returned to the absorption zone, the improvement comprising, uniformizing the amount of SO$_2$ in the SO$_2$ gas flow by adjusting the flow of the SO$_2$-containing absorbent to the stripping zone in response to the output signal from a flow controller which compares the measured value of the rate of the SO$_2$-containing gas flow with a set value, the set value in turn being the output signal from an SO$_2$-concentration controller which compares a signal corresponding to the SO$_2$-concentration in the SO$_2$-containing absorbent with a set value for that concentration.

2. The process of claim 1, wherein the signal corresponding to the SO$_2$-concentration in SO$_2$-containing absorbent is obtained by dividing a signal derived from the measured value of the rate of the gas flow by a signal derived from the measured value of the rate of the flow of absorbent.

3. The process of claim 2, in which a signal derived from the expected average supply of SO$_2$ to the absorption zone is added to the set value for the flow controller.

* * * * *